April 11, 1967 U. ELSTER 3,313,166

TOOTHED BELT DRIVE

Filed March 16, 1965

INVENTOR

ULRICH ELSTER

United States Patent Office 3,313,166
Patented Apr. 11, 1967

3,313,166
TOOTHED BELT DRIVE
Ulrich Elster, Langenhagen, Germany, assignor to Continental Gummi-Werke Aktiengesellschaft, Hannover, Germany
Filed Mar. 16, 1965, Ser. No. 440,169
Claims priority, application Germany, Mar. 19, 1964, C 32,450
7 Claims. (Cl. 74—229)

The present invention relates to a toothed belt drive comprising a toothed belt of elastically deformable material and provided with reinforcing means extending substantially in longitudinal direction of the belt. The belt drive furthermore comprises gears having teeth adapted to engage tooth spaces in the belt.

It is an object of the present invention to provide a toothed belt drive of the general character mentioned above, which will permit a considerable reduction in the flank angle of the teeth.

It is another object of this invention to provide a belt drive as set forth above, which will permit a reduction in the height of the teeth below the height heretofore considered admissible.

Still another object of this invention consists in the provision of a toothed belt drive which will eliminate the heretofore encountered formation of folds where the belt teeth engage the tooth spaces of the gears.

These and other objects and advantages of the invention will appear more clearly from the following specification in connection with the accompanying drawing, in which.

Figure 1:
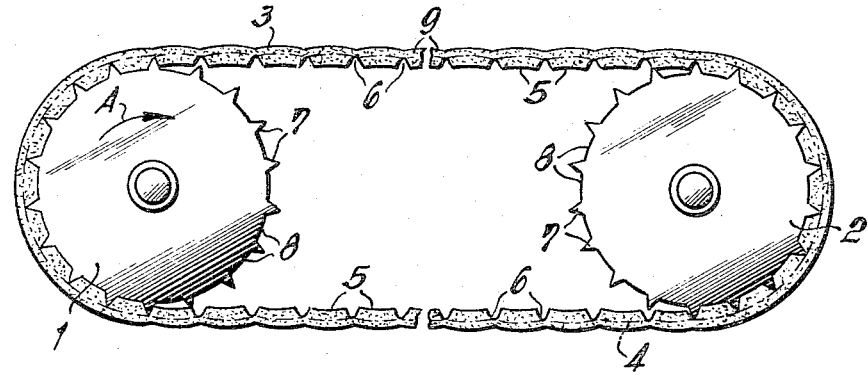
FIG. 1 illustrates partly in section a side view of a belt drive according to the present invention.

The present invention is characterized primarily in that the belt teeth at their dedendum line when looking in the direction of movement of the belt are considerably longer than the gear teeth at their dedendum line and that the belt teeth have a height exceeding that of the gear teeth to such an extent that the addendum of the belt teeth is in frictional engagement with those circumferential portions of the gear wheels which are located between the gear teeth, while the gear teeth engage the belt teeth at the tooth flanks only.

This arrangement according to the present invention has considerable advantages over toothed belt drives heretofore known. In this connection, it should be mentioned that the present invention makes possible a desired reduction of the flank angle of the teeth thereby obviating a skipping of the belt as it may occur with belt drives heretofore known. With heretofore customary tooth formations having a trapezoidal cross section, and with only a slight difference in the length of the gear teeth and belt teeth, there always remained a free component of the circumferential forces—even when considering the sliding friction—which component acts in the direction of the flanks and tends to lift the belt teeth out of the tooth spaces in the gear wheel. Inasmuch as the magnitude of this component is in direct relationship to the sine of the flank angles, theoretically it could be reduced to a practically negligible value by reducing the flank angle. Such reduction, however, has its limits in view of the geometric conditions at the entry and exit portions. As soon as with a given height of the tooth, the flank angle drops below a certain optimum minimum value, sliding movements of the belt teeth and the respective gear teeth pertaining thereto will occur with regard to each other at said portions, and the friction inherent thereto leads to a particular accelerated wear. On the other hand, the height of the teeth cannot be reduced at random without causing undue high surface pressures on the tooth flanks.

The above outlined difficulties have been obviated by the present invention, and in addition to the obtained and desirable reduction in the tooth flank angle, there is obtained a further advantage which consists in a better possibility of taking advantage of the different materials for the belt teeth and the gear teeth. As a rule, the belt teeth are employed in cooperation with metallic gear teeth so that with the heretofore customary cross sectional shape of the teeth, the belt teeth are at a considerable disadvantage over the gear teeth with regard to shearing strength and bending resistance. The increase in the size of the belt teeth in conformity with the present invention at the expense of the size of the gear teeth brings about a considerable equalization of the different strength values of belt teeth and gear teeth. In taking advantage of this finding, in order to obtain an optimum adaptation of the characteristic magnitudes of the toothed belt drive with regard to each other, it is suggested in a further development of the present invention to make the length at the dedendum line of the belt teeth and of the gear teeth inversely proportional to the shear resistance of the respectively employed materials.

In order to be able to realize the above mentioned advantages, it is important to adapt the height of the belt teeth and gear teeth relative to each other. The present invention therefore abandons the heretofore customary construction principle to rest the toothed belt at its tooth spaces on the heads of the gear teeth, and instead rests the teeth of the toothed belt on the bottom of the tooth space between the gear teeth. In this way, for all practical purposes, there will be created a flat belt with increased cushions and with transverse grooves with wider spaces therebetween. The belt cooperates in a driving or driven manner with flat pulleys while the circumference of the pulleys is provided with axial webs which assure a synchronous movement. Due to the increased head surface of the belt teeth, a portion of the power can be conveyed by pure frictional connection so that the surface compression at the tooth flank will be held extremely low. As a result thereof, an overloaded tooth will shear off in the cross sectional plane of the greatest shearing stress before the surface of the loaded flank can be destroyed or only damaged. Thus, the present invention creates a further prerequisite for allowing a reduction in the height of the teeth below the values heretofore considered admissible.

Advantageously, the belt teeth are in the direction of movement of the belt provided with a curvature which is inwardly concave in order from the very start to adapt the belt teeth surface facing the respective gear tooth surface to the curvature of the gear wheel and to prevent any interfering formation of folds. In addition to this effect which is limited to the surface of the respective belt teeth in mesh with the gear teeth, there is obtained a further important advantage. This advantage consists in a so to speak undulous course of the pulling belt section which imparts upon the latter a certain elasticity and makes it non-sensitive against a shock-like change in the load or in the direction of the transmitted forces.

Inasmuch as such shaping cannot be realized with tooth pitches of customary magnitude, the present invention gains particular importance with the design of the teeth in conformity with the present invention. The curved shaping outlined above can be realized without difficulties with heretofore customary production methods because the toothed belt is built up as an endless belt on mandrels with cylindrical surface, is cast or otherwise composed and after solidification of the elastic material, the surface curvature of the mandrel will form the inner confining surface of the teeth. The adaptation to the curved circumferential surface of the gear wheel as it becomes necessary with the resting of the belt teeth on the tooth space bottom between the wheel teeth brings about that the gear teeth are grasped in a clutch-like manner inasmuch as with the entry of the respective belt teeth into the respective wheel, the flank angle between adjacent belt teeth becomes smaller or more acute, and the tooth spaces between the belt teeth will have the tendency to become smaller with regard to he embraced wheel teeth. Such friction-closed embrace or clutching counteracts the climbing of the belt on the wheel teeth and obviates a skipping of the belt teeth during the rotation of the belt. On the other hand, the reversal of these conditions when the belt teeth leave the respective wheel, brings about a frictionless lifting off of the belt teeth from the wheel.

The belt is in customary manner provided with continuous reinforcing means, for instance in the form of pull-resistant steel wires or wire strands, said wires or wire strands may be wound helically over the entire width of the belt. In conformity with the present invention, the said reinforcing means are advantageously arranged within the range of the dedendums, preferably so that said reinforcing means will have those sections thereof which extend between adjacent belt teeth at the bottom of the tooth spaces located outside the range of engagement of the gear teeth. In this way, the reinforcing means are protected against harmful axial compression or buckling stresses, and simultaneously there will be avoided the occurrence of the so-called polygonal effect which may occur otherwise with non-uniform acceleration within the entering and leaving cord-shaped partial sections of the pulling section of the belt.

The tooth shapes according to the present invention, which are considerably simpler than the shape of heretofore known teeth in toothed belt drives, furthermore bring about simplifications and savings in cost with regard to the construction of the production means, casting forms or the like. This also holds true to an even greater extent for the production of different belt sizes.

Figure 2:
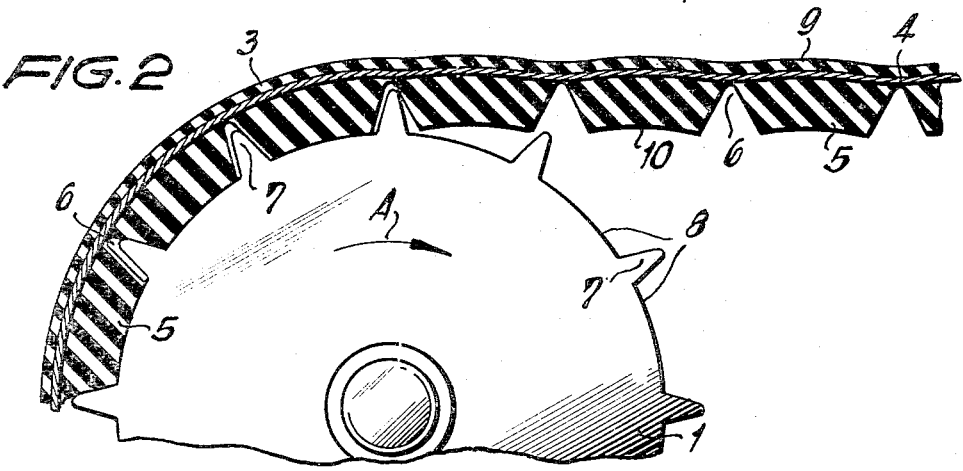
FIG. 2 illustrates partly in section the left-hand side of FIG. 1 but on a larger scale than the latter.

Referring now to the drawing in detail, the toothed belt drive illustrated in FIGS. 1 and 2 comprises two identical gears 1 and 2 which are in mesh with and surrounded by an endless toothed belt 3. Gear 1 is assumed to be the driving gear turning in the direction of the arrow A and through the intervention of toothed belt 3, forming a flexible pulling means, brings about a rotation of driven gear 2 in the same direction as gear 1. The teeth 5 of belt 3 engage the tooth spaces 8 and in mesh with gear teeth 7 assure a slip-free power transmission while avoiding angular distortion of the two gears 1 and 2 with regard to each other.

Belt 3 is made of elastically deformable material as for instance rubber or rubber-like synthetic materials or of pourable synthetic materials such as polyurethane, or the like. The belt 3 furthermore comprises continuous reinforcing means 4 embedded therein and consisting of thin helically wound steel wires or wire strands arranged adjacent to each other. Belt 3 has a substantially flat rectangular cross section and functionally comprises an outer continuous section 9 and an inner non-continuous part which forms the teeth 5. The reinforcing means 4, which belong to the continuous part 9, form the dedendum line of teeth 5 and extend between adjacent belt teeth at the bottom of the tooth spaces 6 between belt teeth 5. Tooth spaces 6 have a cross section of acute angular shape with rounded tips or apex portions and at their foot end are considerably narrower than the heads pertaining to the belt teeth 5 and located on the same line when looking in the direction of movement of the belt.

In conformity with the non-symmetric belt teeth arrangement, also teeth 7 of the gears 1, 2 are in circumferential direction of the gears considerably shortened relative to the tooth spaces 8 of said gears. Thus, as is clearly evident from the drawings, the extension of the belt teeth at the base thereof in the longitudinal direction of the belt is a multiple of the corresponding extension of the wheel teeth at their base. The gear teeth likewise have a triangular cross section, but it should be noted that their height is less than the depth of tooth spaces 6 in belt 3. Inasmuch as the gear teeth 7 engage the belt tooth spaces 6 with slight flank play, the reinforcing means 4 will remain outside the range of engagement of the gear teeth so that the belt teeth 5 may rest over their entire length on the gear circumference in an unimpeded manner. The concave curvature 10 formed or molded on the tooth heads of the belt aid in a close engagement of the belt teeth with the bottom of the tooth spaces 8 of the gears and thus permit the desired positive frictional engagement to be fully effective. The entry and exit of the toothed belt sections is facilitated by the jaw-like opening and closing of the belt tooth spaces 6 with regard to the respective adjacent gear teeth 7. In extreme instances, not shown in the drawing, it may be possible to get along without the so-called tooth space air, i.e. a play of the wheel teeth in circumferential direction within the tooth spaces of the belt.

Figure 3:
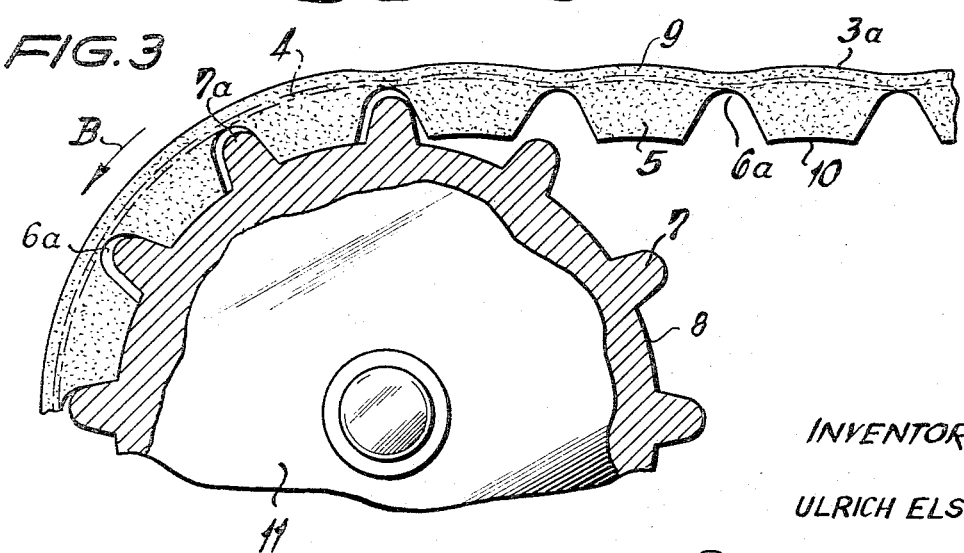
FIG. 3 illustrates partly in section a side view of a portion of a modified belt drive which differs from that of FIG. 2 primarily in the shape of the gear teeth.

The embodiment illustrated in FIG. 3 differs from that of FIGS. 1 and 2 primarily in the cross sectional shape of gear teeth 7a and tooth spaces 6a of belt 3a. The wide rounding and transition arc between the flanks will in this instance permit extremely small flank angles of only a few degrees. The illustrated meshing conditions are based on the driving toothed belt exerting a pulling force in the direction of the arrow B upon the driven gear 11.

It is, of course, to be understood that the present invention is, by no means, limited to the particular constructions shown in the drawing but also comprises any modifications within the scope of the appended claims. A method particularly adapted for making belts according to the present invention, is described in the specification of U.S. Patent 3,114,598. However, any conventional method of making transmission belts may be used.

What I claim is:

1. A belt gear transmission, which comprises in combination: a pair of toothed wheels having two substantially parallel axes arranged in spaced relationship to each other and being substantially aligned with regard to each other in a direction transverse to their axes, and a toothed endless belt passed around said wheels and having its teeth in mesh with said toothed wheels, the dimensional relationship of said belt teeth and said wheel teeth being such that the extension of the belt teeth at the base thereof in the longitudinal direction of the belt is considerably greater than the corresponding extension of the wheel teeth at their base while the height of said belt teeth exceeds that of the wheel teeth to such an extent that the belt teeth when engaging the spaces between the wheel teeth frictionally engage the peripheral wheel portion between the respective adjacent wheel teeth while said wheel teeth engage flanks only of said belt teeth.

2. An arrangement according to claim 1, in which the extension of each of the belt teeth at the base thereof in the longitudinal direction of the belt is a multiple of the corresponding extension of the wheel teeth at their base.

3. An arrangement according to claim 1, in which the extensions of the belt teeth and wheeel teeth at the base thereof and in the longitudinal direction of said belt are inversely proportional to the shear resistance of the material of which said belt teeth and said wheel teeth are made.

4. A belt gear transmission according to claim 1, in which the bottom of the tooth spaces between the wheel teeth is curved along a circle having its center located approximately on the central axis of the respective wheel, and in which the inwardly facing surfaces of said belt teeth are curved in conformity with the curvature of the bottom of the tooth spaces of said wheels.

5. A belt gear transmission according to claim 1, in which the cross section of said wheel teeth is geometrically similar to the cross section of the tooth spaces between the belt teeth.

6. An arrangement according to claim 5, in which the angle between the flanks of adjacent belt teeth is at least equal to the flank angle of the respective wheel tooth extending into the tooth space between adjacent belt teeth.

7. A toothed belt for use in connection with toothed wheels with a relatively short tooth base and relatively long tooth space bottom in the direction of rotation of the toothed wheel, which comprises: a section in form of a continuous endless strip, a plurality of teeth uniformly distributed over one of the major surfaces of said strip section and integral therewith, the adjacent flanks of each two adjacent belt teeth forming with each other a tooth space of acute angular cross section with the widest distance between two adjacent belt teeth flanks of two adjacent belt teeth considerably less than the shortest distance between the tooth flanks of one and the same belt tooth, and reinforcing means extending throughout the entire length of said belt and embedded in said strip section, at least that surface of the belt teeth which is to face a toothed wheel with which it has to cooperate being curved in the longitudinal direction of the belt in conformity with the bottom of the tooth spaces of a toothed wheel with which it is intended to cooperate for frictional engagement with the bottom of the tooth spaces of such toothed wheel.

References Cited by the Examiner
UNITED STATES PATENTS

| | | | |
|---|---|---|---|
| 1,129,366 | 2/1915 | Spangler | 74—229 |
| 2,182,461 | 12/1939 | Yeakel. | |
| 2,554,331 | 5/1951 | Hunter | 74—238 |
| 2,727,401 | 12/1955 | Hansen. | |
| 2,896,458 | 7/1959 | White | 74—216.5 X |
| 3,194,082 | 7/1965 | Mollenkamp | 74—231 |

FOREIGN PATENTS

| | | |
|---|---|---|
| 1,136,554 | 12/1956 | France. |
| 826,099 | 12/1951 | Germany. |
| 435,039 | 5/1948 | Italy. |

DAVID J. WILLIAMOWSKY, *Primary Examiner.*

J. A. WONG, *Assistant Examiner.*